W. B. HOOPER.
HAY LOADER.
APPLICATION FILED JULY 24, 1916.
1,215,375.
Patented Feb. 13, 1917.
3 SHEETS—SHEET 1.
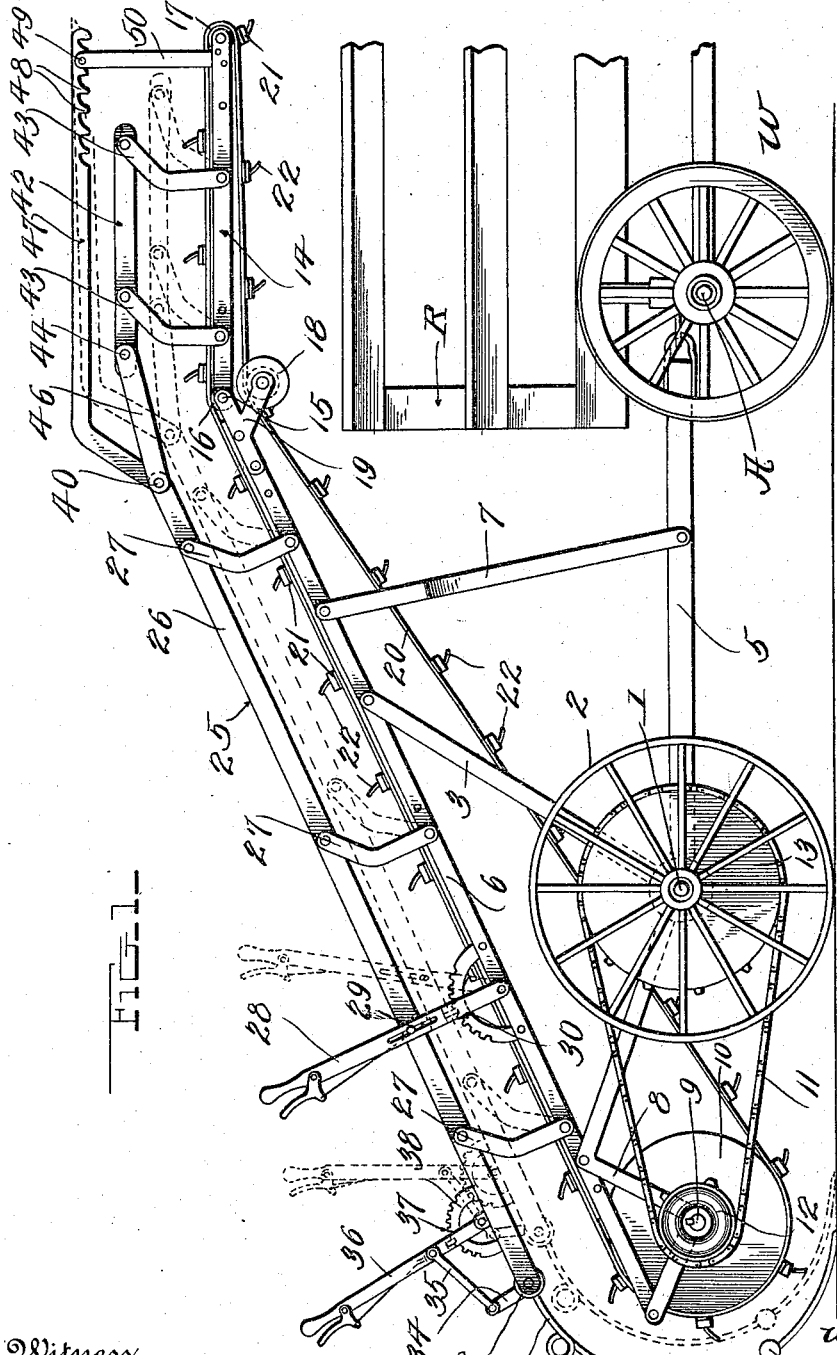

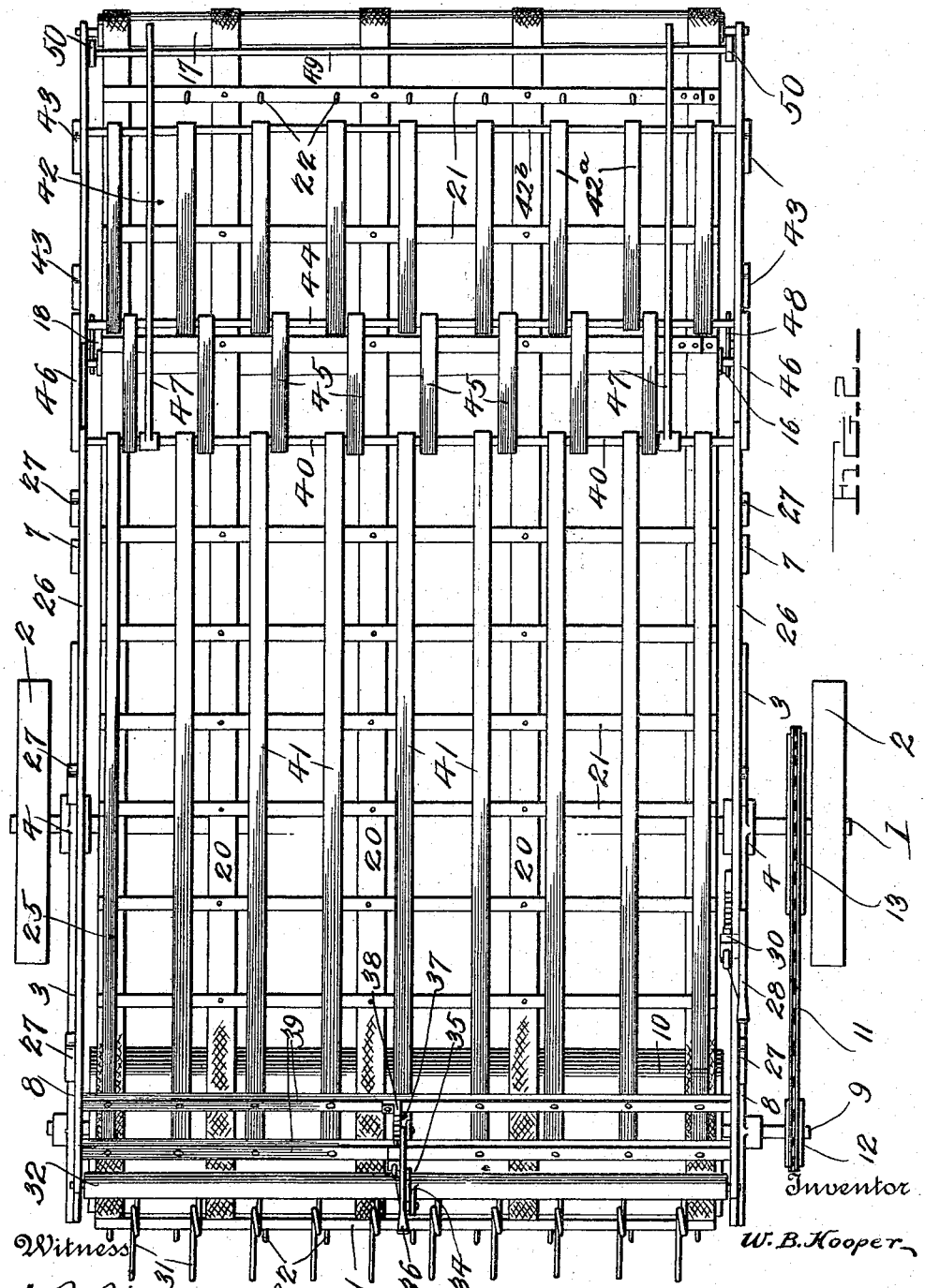

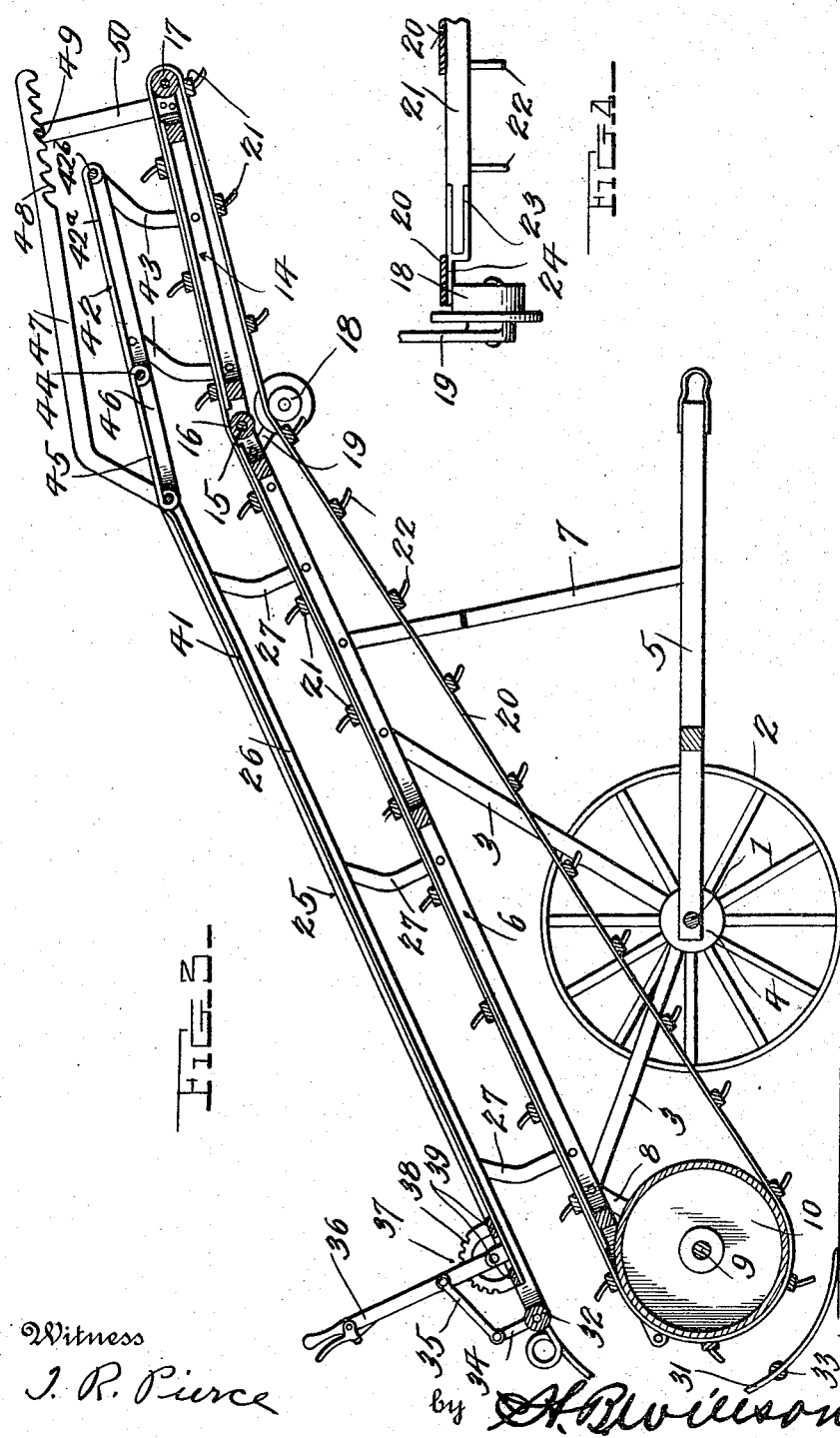

UNITED STATES PATENT OFFICE.

WILLIAM BRUTUS HOOPER, OF WINIFRED, KANSAS.

HAY-LOADER.

1,215,375.  Specification of Letters Patent.  Patented Feb. 13, 1917.

Application filed July 24, 1916. Serial No. 111,076.

*To all whom it may concern:*

Be it known that I, WILLIAM B. HOOPER, a citizen of the United States, residing at Winifred, in the county of Marshall and State of Kansas, have invented certain new and useful Improvements in Hay-Loaders; and I do declare the following to be a full, clear, and exact description of the invention, such as will enable others skilled in the art to which it appertains to make and use the same.

My invention relates broadly to improvements in harvesting machinery and more particularly to hay loaders, the object being to provide a comparatively simple and inexpensive yet highly efficient loader having a uniquely constructed vertically adjustable guard frame above its elevating apron for the purpose of effectively retaining the hay on the latter whether the crop be light or heavy.

With the foregoing general object in view, the invention resides in certain novel features of construction and in unique combinations of parts to be hereinafter fully described and claimed, the descriptive matter being supplemented by the accompanying drawings which constitute a part of this application and in which:

Figure 1 is a side elevation of the improved loader applied;

Fig. 2 is a top plan view thereof;

Fig. 3 is a central longitudinal section; and

Fig. 4 is a detail transverse section showing the manner in which the conveyer slats are fastened to the outermost belts.

In specifically describing the construction shown in the drawings above briefly described, similar characters will be employed to designate corresponding parts throughout the several views and reference will be herein made to the numerous elements by their respective indices. To this end, the numeral 1 designates an axle having wheels 2 on its ends, 3 refers to a pair of V-frames having bearings 4 at their angles which are mounted on the axle 1, 5 represents a suitable tongue and 6 designates an inclined slatted frame whose side bars are secured to the upper ends of the V-frames 3 and braced to the tongue 5 as shown at 7.

A pair of suitably shaped brackets 8 are secured to and depend from the lower or rear ends of the side bars of the frame 6, said brackets carrying appropriate bearings in which the horizontal transverse shaft 9 of a cylindrical drum 10 is rotatably mounted, said drum being driven by means of a sprocket chain 11 and sprockets 12 and 13 from the axle 1, said sprockets 12 and 13 being keyed respectively on the shaft 9 and the axle 1.

An auxiliary slatted frame 14 is pivoted at 15 to the upper end of the frame 6, a roller 16 being mounted on the pivotal axis as shown clearly in Figs. 1 and 3, while an additional roller 17 is disposed at the free end of the frame 14, and flanged rollers 18 are secured by brackets 19 and are positioned beneath the roller 16. A plurality of endless belts 20 of canvas or the like are passed around the drum 10 and over the rollers 16, 17 and 18, said belts having secured thereto a number of transverse conveyer slats 21 which are preferably equipped with prongs 22. The ends of the slats 21 terminate short of the rollers 18 as indicated in Fig. 4 in order that they may pass between said rollers, and said ends are secured in U-shaped clips or the like 23 which are provided with flat extensions 24 projecting beyond the ends of the slats, said extensions being secured to the outermost belts 20. This construction permits the endless belt conveyer to readily travel over the rollers 18.

A guard frame 25 is disposed above and parallel with the frame 6, the side bars 26 of said frame 25 being pivoted to the upper ends of parallel links 27 whose lower ends are pivotally connected to the side bars of said frame 6. By this mounting the frame 25 may be moved forwardly and in so doing will travel downwardly toward the frame 6 as shown in dotted lines in Fig. 1, or by moving said frame 25 rearwardly, it will raise in respect to said frame 6. For moving the frame 25 in this manner, a hand lever 28 is fulcrumed at its lower end to one side of the frame 6 and at 29 has a sliding connection with one of the side bars 26, a pawl and rack arrangement 30 being provided for locking the frame 25 in any of its adjusted positions. A plurality of rake teeth 31 are secured on a rock shaft 32 mounted on the lower end of the frame 25, said teeth being preferably tied together near their lower ends by a tie bar 33. A crank arm 34 rises rigidly from the rock shaft 32 and is connected to a link 35 by a hand lever 36 which is carried by the lower end of the frame 25, a suitable pawl and rack mechanism 37 being provided to lock said lever 36 in its adjusted positions. It will thus be evident that as the frame 25 is adjusted vertically, the teeth 31 may be properly disposed and may be placed under suitable tension.

The rack 38 of the mechanism 37 is secured at its ends to a pair of transverse bars 39 which extend between and are secured to the rear ends of the side bars 26, while at the upper ends of said bars a rod 40 is disposed with its ends passing through apertures in said bars. A plurality of slats 41 of metal or wood extend longitudinally between the bars 39 and the rod 40 and coöperate with these parts and the side bars 26 in forming the guard frame 25 which is adapted to retain the hay upon the upwardly moving reach of the endless belt conveyer.

An auxiliary slatted guard frame 42 is disposed above the frame 14 and connected therewith by links 43 similar to those shown at 27, the rear end of said auxiliary frame having a rod 44 spaced in advance of the rod 40, the two being loosely connected by a plurality of short slats 45 while the side bars of the frames 25 and 42 are similarly joined by means of a pair of links 46, the ends of these links being mounted pivotally on the rods 40 and 44. By this arrangement of parts, it will be obvious that forward or rearward adjustment of the frame 25 by means of the lever 28 will similarly adjust the frame 42. Furthermore, the angular relation existing between the frame 14 and the frame 6 and between the frames 42 and 26 may be varied as will be evident by a comparison of Figs. 1 and 3. In the latter figure the frames 14 and 42 have been elevated for loading at a greater height and regardless of the position of said frames, they will be supported by bars 47 pivoted at its rear end to the rod 40, said bar having ratchet teeth 48 at their front ends which engage a rod 49 extending between the rigid arms 50 which rise from the front end of the frame 14. The ratchet teeth 48 will successively engage the rod 49 as the frames 14 and 42 are forced upwardly and will thus automatically support said frames, but when the latter are to be lowered, it is first necessary to raise the bar 47 to dispose its teeth 48 to inoperative position.

As shown clearly in Figs. 2 and 3, the slats 42$^a$ of the auxiliary guard frame 42 are secured at their rear ends on the rod 44 and at their front ends to a rod 42$^b$ which extends across the front end of said frame.

In use, the tongue 5 will be connected to the rear axle A of a wagon W so as to dispose the auxiliary frames 14 and 42 above the rack R thereof and when said wagon is now drawn over the field, the rake teeth 31 will gather the hay and the endless conveyer which consists of the belts 20, slats 21 and prongs 22 will carry said hay upwardly between said teeth and the drum and between the lower and upper frames, the latter being suitably adjusted to effectively hold the hay upon the conveyer whether the crop be light or heavy. As the rack is filled, the frames 14 and 42 will be necessarily adjusted vertically to load at a greater height, and regardless of the extent to which said frames are moved, they will still perform their respective functions in an efficient manner.

From the foregoing taken in connection with the accompanying drawings, the construction, manner of operation and advantages of the improved machine will be readily understood without requiring a more extended explanation, but in conclusion I will state that although certain specific features have been shown and described for illustrative purposes, numerous changes may be made in the scope of the invention as claimed without sacrificing the main advantages thereof.

I claim:

1. In combination, a main inclined conveyer frame, an auxiliary conveyer frame pivoted to the upper end of said main frame, an endless belt conveyer trained around said frames, a main inclined guard frame above the main conveyer frame, parallel links connecting said main guard and main conveyer frames, an auxiliary guard frame loosely connected with the front end of said main guard frame and extending over the auxiliary conveyer frame, additional links connecting said auxiliary conveyer and auxiliary guard frames, means for supporting both auxiliary frames and for permitting vertical adjustment thereof, and means for permitting longitudinal adjustment of the two guard frames.

2. In combination, a main inclined conveyer frame, an auxiliary conveyer frame pivoted to the upper end of said main frame for vertical movement, an endless belt conveyer trained around the two frames, a main guard frame above the main conveyer frame, parallel links pivoted at their ends to said main conveyer and main guard frames, an auxiliary guard frame above the auxiliary conveyer frame, links pivoted at their upper and lower ends to the two auxiliary frames, means flexibly connecting the adjacent ends of the main and auxiliary guard frames, means for supporting the two auxiliary frames in vertically adjusted positions, and means for permitting longitudinal adjustment of the two guard frames.

3. In combination, a main inclined conveyer frame, an auxiliary conveyer frame pivoted to the upper end of said main frame for vertical movement, an endless belt conveyer trained around the two frames, a main guard frame above the main conveyer frame, parallel links pivoted at their ends to said main conveyer and main guard frames, an auxiliary guard frame above the auxiliary conveyer frame, links pivoted at their upper and lower ends to the two auxiliary frames, both guard frames having transverse rods at their adjacent ends, longitudinal slats secured at one end to said rods, a plurality of auxiliary slats having their ends pivotally mounted on said rods whereby to connect the two guard frames for simultaneous movement and means for supporting the two auxiliary frames.

In testimony whereof I have hereunto set my hand in the presence of two subscribing witnesses.

WILLLIAM BRUTUS HOOPER.

Witnesses:
 CHAS. T. M. SMITH,
 FRED. K. BARRETT.

Copies of this patent may be obtained for five cents each, by addressing the "Commissioner of Patents, Washington, D. C."